June 5, 1962     J. T. SHACKEL     3,037,786
UTILITY CARTS
Filed Aug. 16, 1956     3 Sheets-Sheet 1
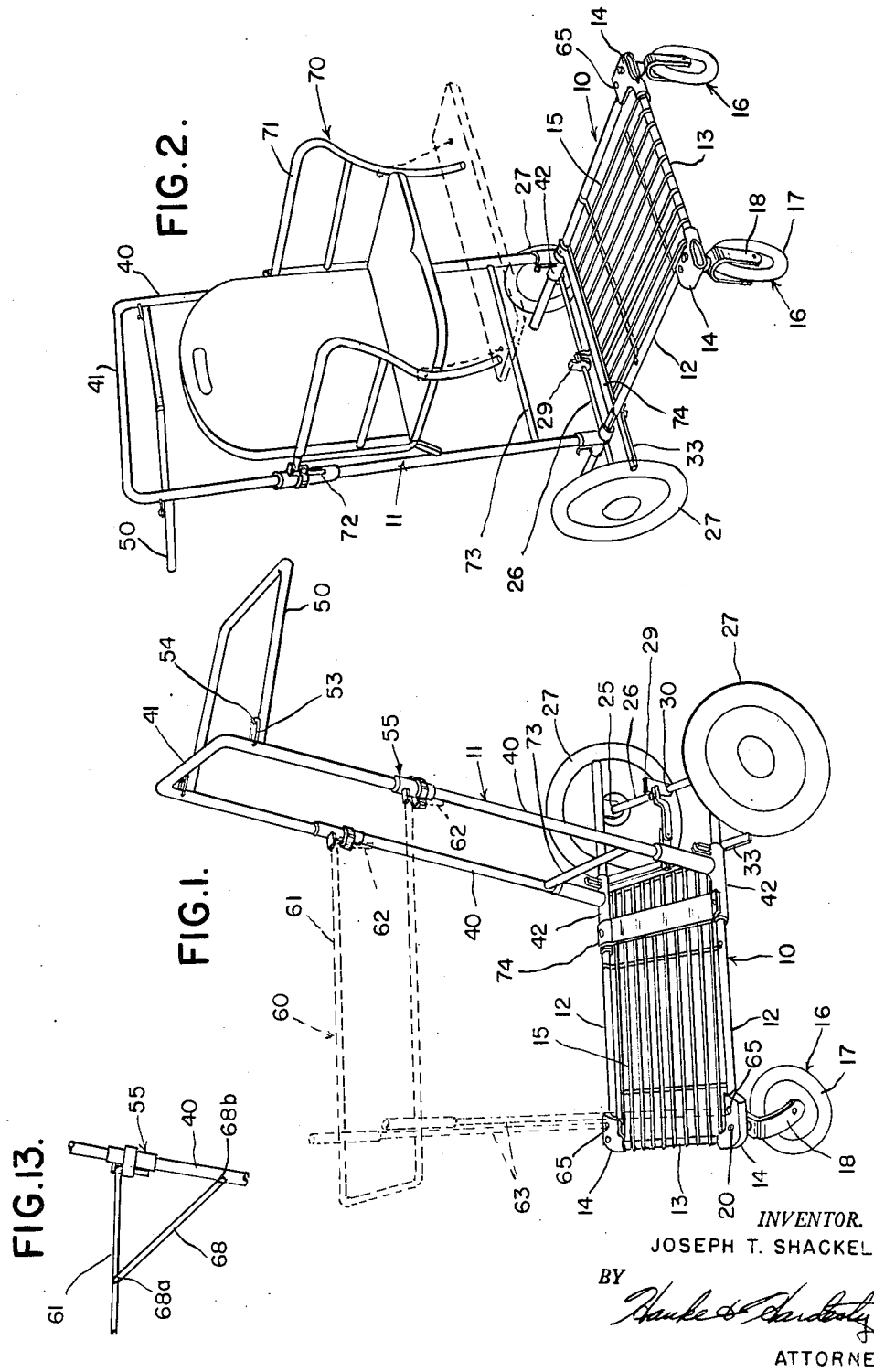
INVENTOR.
JOSEPH T. SHACKEL
BY
ATTORNEYS June 5, 1962
J. T. SHACKEL
3,037,786
UTILITY CARTS
Filed Aug. 16, 1956
3 Sheets-Sheet 2
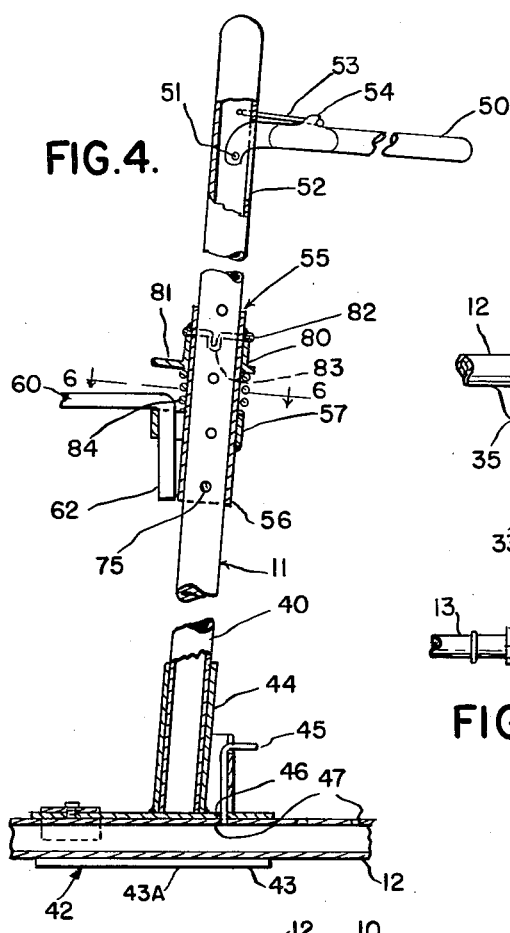
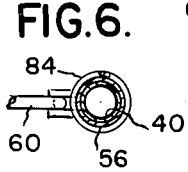
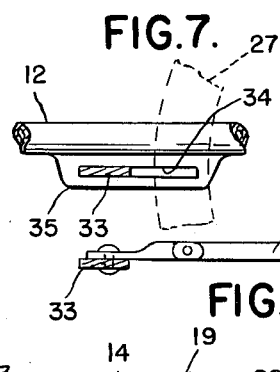
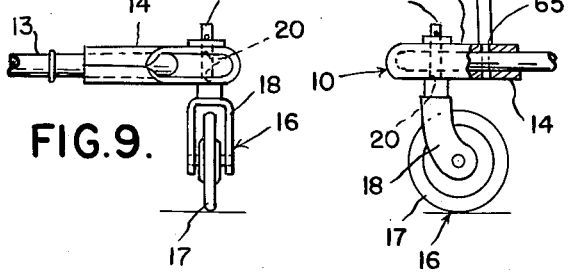
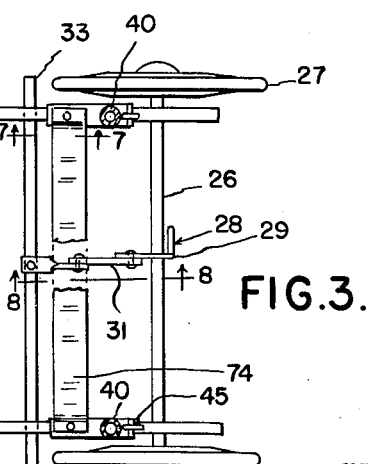
INVENTOR.
JOSEPH T. SHACKEL
BY
*Hauke & Hardesty*
ATTORNEYS

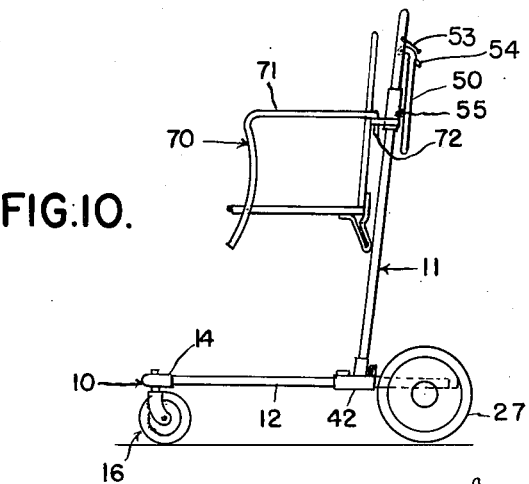
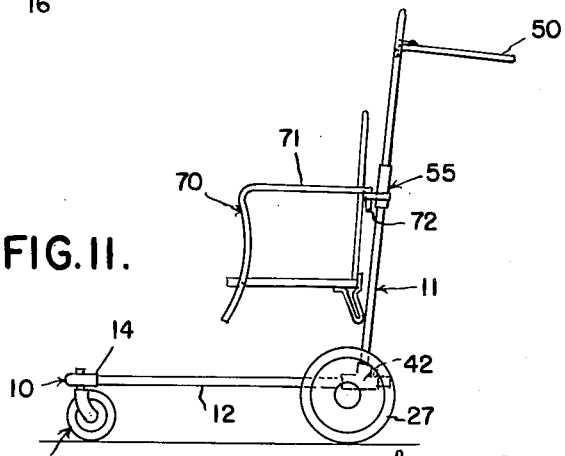
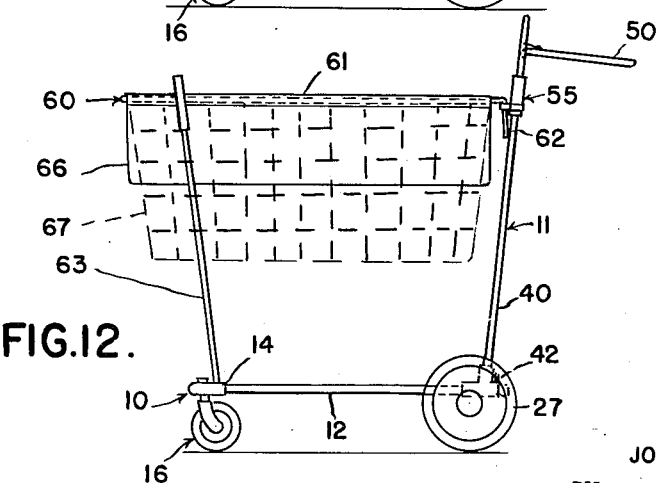

United States Patent Office 3,037,786
Patented June 5, 1962

3,037,786
UTILITY CARTS
Joseph T. Shackel, 14636 Bringard Drive, Detroit, Mich.
Filed Aug. 16, 1956, Ser. No. 604,353
1 Claim. (Cl. 280—47.35)

My invention relates to utility carts and more particularly to the type of cart which may be converted for multiple purposes.

Such utility carts heretofore available suffer from certain drawbacks such as being restricted in use to certain limited functions, lacking proper stability and balance during some of its uses, and being somewhat complicated in construction and causing difficulty in changing from one use to another.

An object of my invention is to construct an improved multiple function utility cart by providing a simplified structure having readily adjustable units which may be so placed as to provide proper balance and stability during all possible uses.

Another object of my invention is to provide an improved multiple-use utility cart by constructing component parts which may be readily connected and adjusted to various uses.

A further object of my invention is to improve utility cart construction by providing a cart comprising basic readily adjustable support structures adaptable for supporting a widely varied combination of accessories.

For a more complete understanding of my invention, reference may be had to the accompanying drawings illustrating preferred embodiments of the invention in which like characters refer to like parts throughout the several views and in which:

FIG. 1 is a perspective view of the utility cart embodying my invention.

FIG. 2 is a different perspective view illustrating one of the varied uses to which the cart may be put.

FIG. 3 is a plan view of the bare frame component assembly of the cart shown in FIGS. 1 and 2.

FIG. 4 is a fragmentary side elevational view, partially in section, of another component assembly of the cart shown in FIGS. 1 and 2.

FIG. 5 is a fragmentary side elevational view, partially in section, of a component assembly of the cart shown in FIG. 1.

FIG. 6 is a cross-sectional detail taken substantially on the line 6—6 of FIG. 4.

FIG. 7 is a cross-sectional detail taken substantially on the line 7—7 of FIG. 3.

FIG. 8 is a cross-sectional detail taken substantially on the line 8—8 of FIG. 3.

FIG. 9 is a fragmentary view as seen substantially from the line 9—9 of FIG. 3.

FIG. 10 is a side elevational view illustrating one position of the utility cart utilizing one type of accessory as shown in FIG. 2.

FIG. 11 is a side elevational view illustrating another position of the utility cart of FIG. 10.

FIG. 12 is a side elevational view illustrating the utility cart as applied with other accessories, and FIG. 13 is a fragmentary view of an alternative accessory supporting structure.

The basic utility cart illustrated in FIG. 1 comprises a base frame structure 10 and an upright carrier structure 11. The base frame structure 10 comprises a pair of spaced longitudinally extending, preferably tubular side bars 12 and a transverse forward bar 13 connecting the side bars 12 preferably by means of carrier fixtures 14. The bars 12 and 13 form a framework to which a grid-like platform 15 is secured.

The corner fixtures 14 are each provided with a conventional pivoted trailing traction wheel assembly 16 having a wheel 17 rotatably supported in a yoke 18 provided with a shaft 19 which extends through a pivot hole 20 in the fixture 14, as shown in more detail in FIGS. 5 and 9. It will be noted that non-pivoted wheels may also be used.

Near the rear ends of the side bars 12 are secured suitable fittings 25 for supporting a rear axle 26 provided with traction wheels 27. A wheel braking and locking mechanism 28 is illustrated in FIGS. 3, 7 and 8, as is conventionally used on equipment such as baby carriages, comprising a pedal 29 pivotally supported as at 30 on the axle 26 and a two-part lever 31 pivotally secured as at 32 thereto. A flat braking bar 33 is secured to the lever 31 at the end opposite the pivot point 32 and is slidably carried in slots 34 of fittings 35 secured to the side bars 12. When the pedal 29 is depressed, the lever 31 is pulled rearward, drawing the bar 33 against the wheels 27.

The upright carrier structure 11 comprises a pair of spaced generally vertical, preferably tubular side bars 40 and an upper connecting cross bar 41. A pair of generally T-shaped fixtures 42 adjustably connects the carrier structure 11 with the base frame structure 10. The fixtures 42 each comprise a horizontal tubular member 43 slidably carried by the base frame side bar 12 and a generally vertical, rearwardly inclined tubular member 44 secured to the member 43 and into which the carrier side bar 40 fits, as shown particularly in FIG. 4. The tubular member 43 is provided with a longitudinal slot 43A which allows the fixture 42 to be longitudinally adjusted past the fittings 35. A locking means is provided for selectively locking the fixture 42 in any one of a plurality of desired longitudinal positions. This may be any device such as a pin 45 selectively positioned into a hole 46 provided in the member 43 and any one of a plurality of holes 47 provided in the base frame side bar 12.

A generally U-shaped handle bar 50 is pivotally secured as at 51 within slots 52 in the upright side bars 40. A loop element 53 connected to each side bar 40 is provided to engage a finger element 54 on each leg of the handle bar 50 to hold the handle bar 50 in a raised position. The bar 50 may thus be released and pivoted downward as desired.

An accessory fixture 55 is slidably secured to each side bar 40 and comprises a tubular member 56 having a socket fitting 57 secured thereto. Various accessories may be adapted to be connected to the side bars 40 by means of the socket fittings 57. One such accessory, as shown in FIGS. 1, 5 and 12 comprises a frame support 60 having a generally U-shaped tubular member 61 provided with down-turned extensions 62 which may be removably connected to the socket fittings 57 as shown in FIG. 4. A pair of legs 63 are pivoted as at 64 to the member 61 and are adapted to fit into a socket 65 provided in the corner fixtures 14, as shown in FIG. 5. Any of a variety of component accessories, such as a baby carriage basket 66 or a shopping basket 67 as shown in FIG. 12 may be adapted to be carried by the frame support 60.

Instead of the legs 63, support arms 68 removably secured to the member 61 by any means such as a pin 68a in the member 61 and to the side bars 40 by any means such as a pin 68b as shown in FIG. 13 may be utilized, as when the utility cart is used as a roll-way beside table, the frame support 60 going above and the base frame structure 10 going below the bed.

Other accessories, such as a high chair or stroller seat 70, as shown in FIGS. 2, 10 and 11 may have some other frame support 71 provided with down-turned extensions 72 similar to the extensions 62 of the frame support 60.

It may be noted that additional supports or braces may be provided as needed on the base frame structure 10 and the upright carrier 11, such as a lower carrier bar 73 and a transverse brace 74 secured between the fixtures 42, as shown in FIGS. 1 and 2.

The accessory frame supports 60 and 71 connected to the fixtures 55 may be vertically adjusted and locked on the upright carrier side bars 40 by any means such as a pin 75 extending through aligned holes in the fixture members 56 and the side bars 40. The frame supports 60 and 71 are also preferably positively locked into the socket fitting 57 by any means such as is shown in FIG. 4, in which a fitting 80, rotatably carried on the member 40, is provided with a flange element 81 which extends over the extension 62 when in the position shown. A retainer ring 82 is secured to the tubular member 56 above the fitting 80 and is provided with a depressed U-portion 83 which engages in a slot in the fitting 80. A spring 84 holds the fitting 80 in position against the retainer ring 82. To release the frame supports, the fitting 80 is pressed downwardly against the spring 84 and rotated so that the flange 81 provides space for removal of the extension 62 from the socket fitting 57.

FIGS. 10 and 11 illustrate the utility of the longitudinal adjustment of the upright carrier 11 on the base frame structure 10 in combination with the vertical adjustment of the frame support 71 on the carrier 11. In FIG. 10, the raised chair 70 serves as a high chair, and to maintain stability, a forward longitudinal adjustment is used. When the chair 70 is lowered as in FIG. 11 to serve as a stroller, a rearward longitudinal adjustment is used.

Although I have described and illustrated only a few preferred embodiments of my invention, it will be apparent to one skilled in the art to which the invention pertains that various changes and improvements may be made therein without departing from the spirit of the invention or the scope of the appended claims.

I claim:

A wheeled utility cart of the character described comprising a base frame structure having spaced longitudinally extending side members, traction wheels supported by said frame structure, an upright carrier structure longitudinally adjustably secured to said side members and having a fixed angular relation to said side members in all adjusted positions, an accessory structure, and means adjustably securing said accessory to said upright carrier structure, said accessory structure being disposed at all times to overlie said base frame structure, said upright carrier comprising a pair of spaced connected bars extending generally vertical and inclined slightly to the rear, said carrier arranged to be disposed in a forwardly adjusted position when carrying an accessory structure disposed in a high adjusted position, whereby to maintain said assembly in balance, a handle bar pivotally carried by said upright carrier adjacent the upper extremity thereof, said accessory structure comprising a child's seat structure detachably secured thereto, said upper adjusted position of said seat structure comprising a high chair assembly and said lower adjusted position comprising a stroller assembly, said stroller assembly utilizing a rearward adjustment of said carrier structure on said base frame structure.

References Cited in the file of this patent

UNITED STATES PATENTS

| | | |
|---|---|---|
| 2,004,470 | Michal | June 11, 1935 |
| 2,422,862 | Stottrup | June 24, 1947 |
| 2,426,432 | Breckner et al. | Aug. 26, 1947 |
| 2,435,733 | Belyeu | Feb. 10, 1948 |
| 2,624,395 | Johnson | Jan. 6, 1953 |
| 2,664,144 | Johnson | Dec. 29, 1953 |
| 2,667,985 | Woughter | Feb. 2, 1954 |
| 2,754,889 | Lovelace | July 17, 1956 |

FOREIGN PATENTS

| | | |
|---|---|---|
| 1,084,855 | France | July 13, 1954 |